June 17, 1930. B. A. SMALL 1,763,906
TIRE CHAIN APPLYING DEVICE
Filed Nov. 13, 1926 2 Sheets-Sheet 1
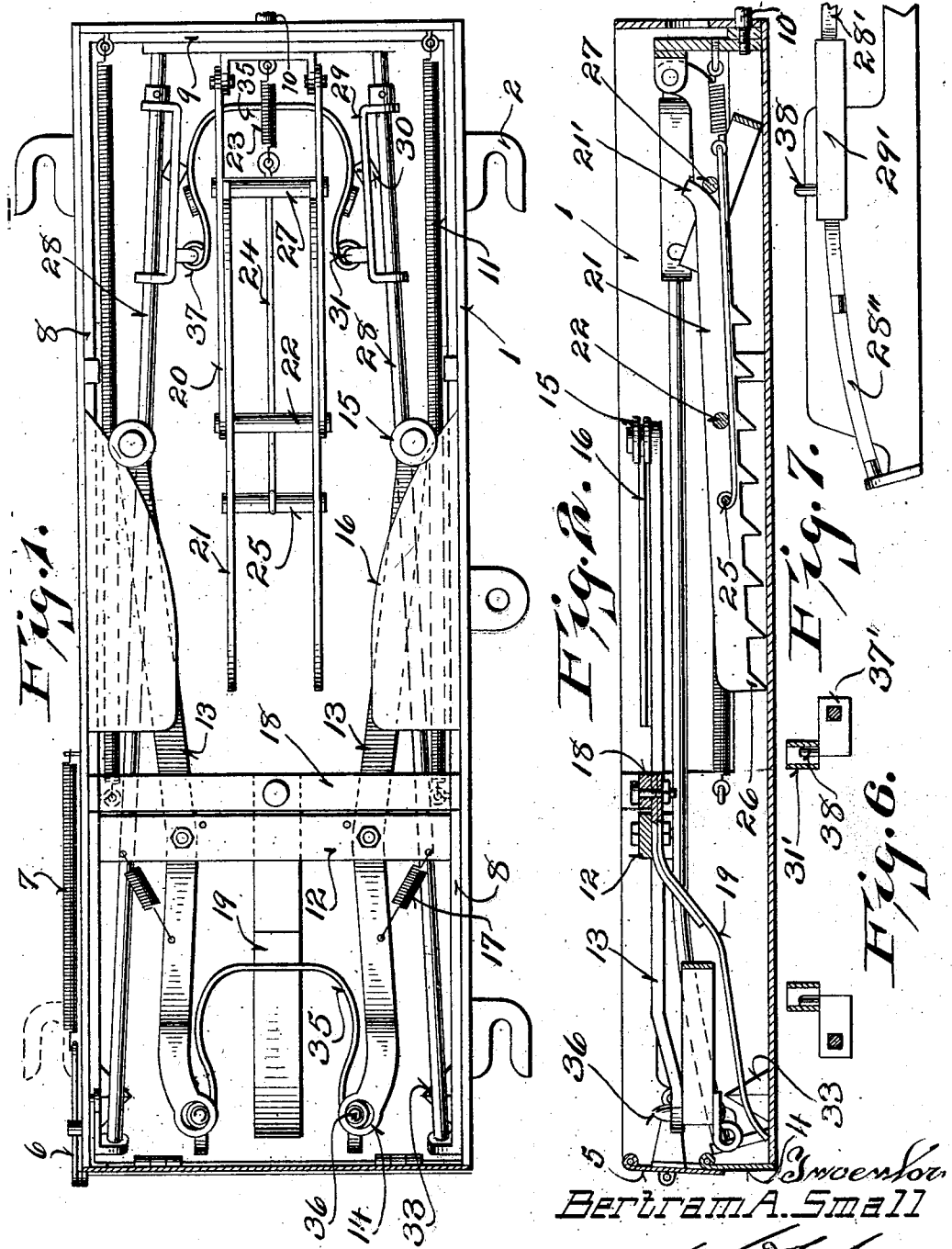
Inventor
Bertram A. Small

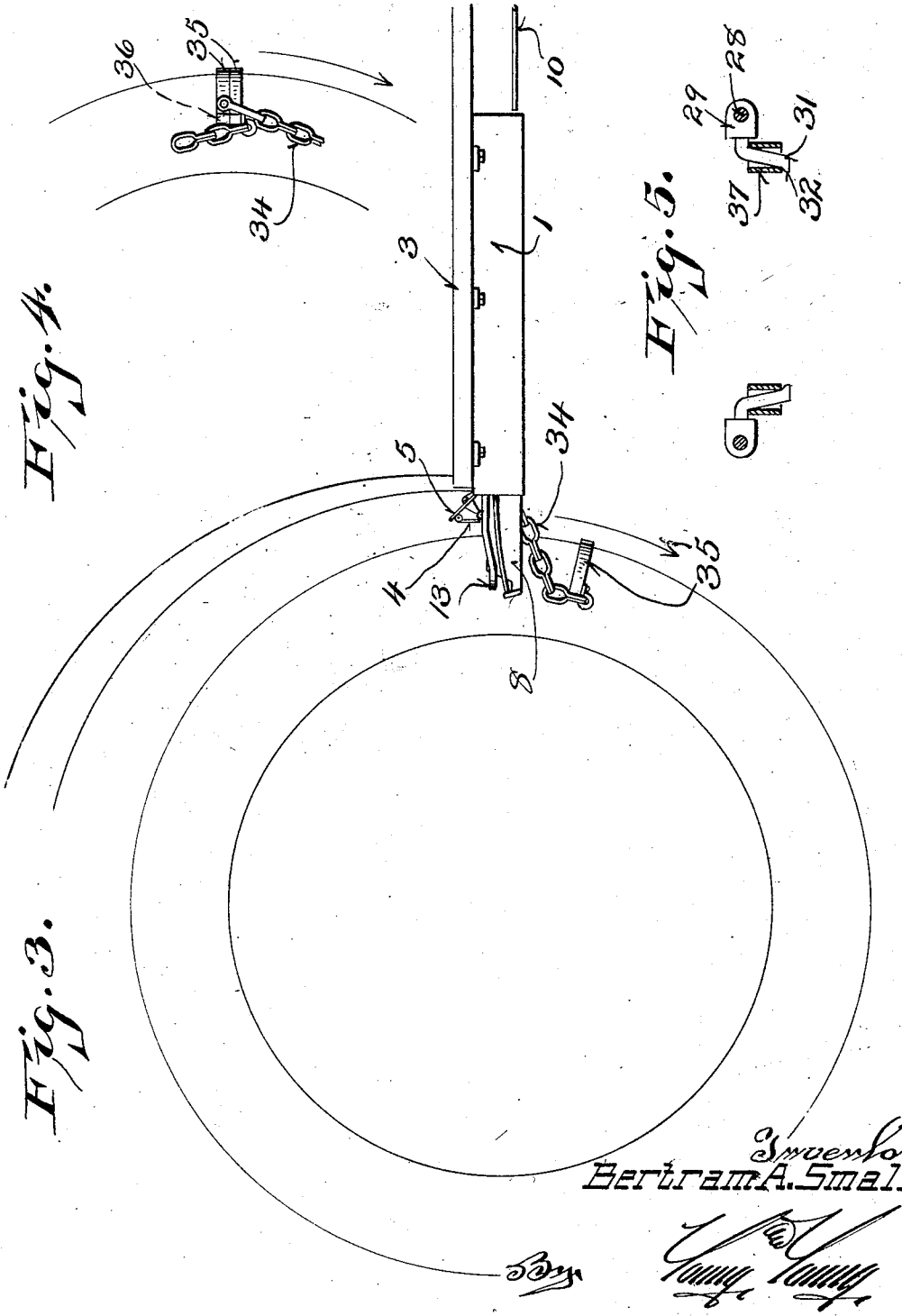

Patented June 17, 1930

1,763,906

UNITED STATES PATENT OFFICE

BERTRAM A. SMALL, OF CHICAGO, ILLINOIS, ASSIGNOR OF ONE-THIRD TO WILLIAM D. THOMPSON, OF RACINE, WISCONSIN

TIRE-CHAIN-APPLYING DEVICE

Application filed November 13, 1926. Serial No. 148,296.

This invention relates to a device for carrying and applying chains of the anti-skid type for automobiles and similar vehicles.

Objects of this invention are to provide a device which will carry the anti-skid chains when not in use and which will automatically, when initiated by the operator, apply the chains and clamp them to the wheels of an automobile in a wholly automatic manner and while the car is in motion.

Further objects are to provide a device of this nature which is very compact and may be readily attached to the underside of the running boards or other relatively stationary parts of the vehicle, and which will hold the chains against rattling or displacement while the chains are stored in the device, and which will readily and substantially instantaneously project the chains outwardly therefrom and cause them to grip the wheel, so that they will be drawn around the same in place.

Further objects are to provide a strong, simple, and reliable type of device which is of extremely compact and rugged construction, and one which is not likely to get out of order.

Embodiments of the invention are shown in the accompanying drawings in which:—

Figure 1 is a plan view of the device as it appears when removed from the vehicle;

Figure 2 is a longitudinal sectional view through the device;

Figure 3 is a fragmentary elevation of a portion of the automobile showing the device in the act of applying the chain to the tire;

Figure 4 is a fragmentary view of a tire showing the interlocking engagement of the clamping members at the ends of the chain;

Figure 5 is a detail of the rear holding means, such view being diagrammatic;

Figure 6 is a fragmentary view partly diagrammatic, and similar to Figure 5 showing a modified form of carrier for the rear end of the chain;

Figure 7 is a fragmentary view of a modified form of guiding rod and of the rear carrier for the chain.

Referring to the drawings, it will be seen that the device comprises a metal container 1 which is provided with a plurality of slotted or apertured ears or lugs 2 (by means of which it may be bolted to the underside of the running board or other suitable portion of an automobile,) as indicated, for example, in Figure 1. The container is closed at one end and is provided with a lower and an upper door, as indicated by the reference characters 4 and 5, at its other end. These doors are preferably hinged together and form in effect a single jointed door. The uppermost portion of the door is provided with an arm 6 which is connected to a spring 7 so that the door is spring held in a closed position under normal conditions.

Within the container a U-shaped metal frame is positioned. This metal frame has side bars 8 and a rear transverse portion 9, as shown most clearly in Figure 1. The rear transverse portion is engaged by an operating rod 10 which is adapted to be pushed inwardly in any suitable manner as, for example, by means of link and lever connections under the control of the operator. This U-shaped frame is urged towards housed position as shown in Figure 1, by means of the elongated tension springs 11. Further, it is to be noted from Figure 1, that the U-shaped member or frame carries a transverse bar 12 upon the underside of which a pair of levers 13 are pivoted. These levers are provided with apertured outer ends 14 and carry grooved cam rollers 15 at their inner ends. The cam rollers are adapted to travel upon the stationary cams 16 secured to the casing 1, as shown in Figures 1 and 2, to thus control the motion of the levers, as will hereinafter appear. Further, it is to be noted that relatively light springs 17 are connected to the levers and urge them towards open position as regards their outer ends. A stationary transverse bar 18 is secured rigidly to the container 1 and carries a leaf spring arm 19, as shown in Figures 1 and 2. This leaf spring arm rests against the bottom of the container and aids in placing a tension upon the chain as it is withdrawn beneath such arm.

The U-shaped member forms in reality a carriage which may have its forward end projected from the casing, as indicated in Figure 3, during the application of the chains to the wheels. The rear portion of the frame carries a pair of pivotally mounted arms or levers 20 which, in turn, carry levers 21 at their outer ends, the levers being pivoted, as indicated at 22, to the outer ends of the arms 20. A spring 23 is connected to the rear portion of the movable carriage, as shown in Figures 1 and 2 at one end, and is connected to a link 24 at its forward end. The forward end of the link passes below the pivotal portion of the pin 22 (see Figure 2) and as may be seen from such figure, has its forward end pivotally engaging a transverse pin 25 secured to the arms 21. The arms 21, it will be noted particularly from Figure 2, are provided with downwardly extending fingers 26 which are provided with tapered rear faces and which are adapted to bear against the stored chain to hold it against rattling. These arms 21 are free to rock upwardly against the action of the spring 23 when the chains are being withdrawn. Further, it is to be noted that the rear portions 21' of these arms bear against a stop pin 27 carried by the levers 20.

It is to be noted further from reference to Figures 1 and 2 that the U-shaped frame carries a pair of forwardly diverging guide rods 28. These guide rods are secured at their front and rear ends to the carriage or movable frame, as may be most clearly seen from Figure 1. They carry slides 29 which have inwardly turned apertured portions freely slidable upon such guide rods. The slides 29 carry cam-like projecting portions 30 for a purpose hereinafter to appear. Further, they are provided with fingers or arms 31 (see Figures 1, 2, and 5), the fingers being preferably provided with small projecting inner portions 32, as shown in Figure 5. It is to be noted further that tapered cam-like projecting parts or members 33 are provided adjacent the forward diverging ends of the guide rods 28, as shown most clearly in Figures 1 and 2, for a purpose hereinafter to appear.

The chains consist of the ordinary type of non-skid chains 34 (see Figures 3 and 4) with the exception that the ends of the chains are provided with relatively stiff U-shaped spring members 35 which are adapted to grip the tire casing, as shown in such figures. The forward U-shaped spring member is provided with upwardly projecting pins 36 having tapered ends, as shown most clearly in Figure 2. The rear U-shaped spring member 35 is provided with eyelets 37.

In using the device, the eyelets 37 of the rear spring gripping member 35 are engaged by the fingers 31 of the slides 29. The slides are moved backwardly along the guide rods 28 into the position shown in Figure 1, and the chain is stored beneath the spring pressed levers 21 which yieldingly retain them in place against rattling. Further, the chain passes beneath the spring arm 19 adjacent the forward portion of the device. It is to be noted in this connection that the chain itself has been omitted from Figures 1 and 2 for the sake of clearness, and only the gripping spring arms 35 have been illustrated. The forward gripping spring arm or U-shaped clip 35 has its projecting pins 36 received in the apertured ends 14 of the levers 13. This is the normal or stored condition of the parts and represents the apparatus as it appears prior to the application of the chain to the tire. When it is desired to apply the chain to the tire all that is necessary is for the operator to move the rod 10 forwardly by means of lever and link mechanism or in any suitable manner to engage the U-shaped frame. This moves the U-shaped frame or carriage forwardly and causes the arms 13 to rock about their pivot points due to the action of the cams 16, thus opening the front spring clip 35 and positioning it about the tire. Thereafter, the rollers 15 ride off the ends of the cam 16 and the stiff U-shaped spring clip 35 immediately contracts and grips the tire, drawing the forward ends of the arms toward each other and spreading the rear ends. After said spring clip is released from the arms 13 the relatively light springs 17, which heretofore were opposed by the stronger spring clip 35, spread apart the outer ends of said arms 13 and cause the inner ends 15 to approach each other and thus clear the cams 16. The spring clip 35 rotates with the tire and draws the chain around the wheel, as indicated in Figure 3, and the slides 29 ride outwardly on the diverging guide rods 28, thus expanding the rear spring clip 35 when the slides first arrive at their outer position. The rear spring clip 35 is positioned about the tire and its eyeleted ends 37 are held temporarily by the fingers 31 (see Figure 5). As the wheel rotates it draws the eyeleted ends downwardly free from the fingers 31 and allows the spring clip to clamp itself about the tire casing just back of the first or forward spring clip, as shown in Figure 4. Under these conditions, it is to be noted that the pins 36 carried by the front clip enter the eyelets 37 of the rear clip and thus lock the parts together. Inasmuch as these clips are positioned one behind the other, as shown in Figure 4, and also are interlocked by the pins 36, it is apparent that the chains are very securely locked to the tire.

It is to be noted that the spring pressed front door readily opens, as shown in Figure 3, to permit the projection of the carriage or frame of the device.

In repositioning the apparatus, it is to be noted that the cams 33 come into play and strike the members 30 of the slides 29, thus rocking the arms 31 upwardly clear of the front bottom edge of the container.

This operation is necessary, and it will be noted that the guide rods 28 slope downwardly adjacent their discharge or forward ends.

In the modified form shown in Figures 6 and 7, it will be noted that the guide rods 28' are square throughout their major portion, and that the extreme outer ends thereof are rounded as indicated at 28". The slides 29' are provided with rectangular openings 37' (see Figure 6) which normally hold the slides against rocking motion. Further, it is to be noted that these slides are provided with upwardly projecting pins 38 which, as may be seen from Figure 6, engage the eyeleted portions 31' of the rear spring clip.

The operation of this form of the invention is as follows:

When the slides 29' are upon the rectangular portion of the guides 28', they are prevented from rocking and freeing themselves from the eyeleted portions of the rear spring clip. However, when the slides arrive at the rounded portion 28" of the guide rods, they are free to rock and permit disengagement of the rear spring clip therefrom.

It is to be understood that although an enclosing container is the preferred form for the guiding portion of the device, that other forms of guides may be used for the movable U-shaped frame or carriage. The purpose of the container with its spring closed jointed door is to prevent the entrance of mud, dirt, and grit into the device, and assist in retaining the chain within the container.

It will be seen that a device has been provided which will readily apply chains to automobile wheels while the automobile is in motion.

Further, it will be seen that the device is relatively simple and is of sturdy and reliable construction.

Further, it will be seen that the device remains inoperative until it is desired to place the chains upon the wheels. This operation can be most easily secured by merely operating the control rod 10 to project the parts into the position shown in Figure 3, after which the device will automatically apply and lock the chain to the rotating wheel.

It is to be noted further that the device is very compact and does not detract from the appearance of the automobile. In fact, it is scarcely noticeable when applied, as indicated in Figure 3.

Although the invention has been described in considerable detail, such description is intended as illustrative rather than limiting as the invention may be variously embodied and as the scope of such invention is to be determined as claimed.

I claim:

1. The combination of a vehicle having wheels and a body portion, a container carried by said body portion adjacent a wheel, a U-shaped carriage slidably carried within said container, manually controlled means for projecting said carriage outwardly towards said wheel, a pair of levers pivotally carried by said carriage and positioned upon opposite sides of said wheel when said carriage is moved outwardly, a tire chain normally stored within said container and having spring clips at its outer ends adapted to transversely grip a peripheral portion of said wheel, the outer ends of said levers engaging the ends of one of said spring clips, cam means for first spreading said outer ends of said levers to spread the ends of the corresponding clip when said carriage is moved outwardly and thereafter releasing said levers to allow the spring clip to grip the wheel, springs tending to rock said outer ends away from each other, a pair of guide rods carried by said carriage and diverging outwardly towards the outer end of said carriage, a pair of slides mounted upon said guide rods and having fingers temporarily engaging the ends of the second of said spring clips.

2. The combination of a vehicle having wheels and a body portion, a container carried by said body portion adjacent a wheel, a U-shaped carriage slidably carried within said container, manually controlled means for projecting said carriage outwardly towards said wheel, a pair of levers pivotally carried by said carriage and positioned upon opposite sides of said wheel when said carriage is moved outwardly, a tire chain normally stored within said container and having spring clips at its outer ends adapted to transversely grip a peripheral portion of said wheel, the outer ends of said levers engaging the ends of one of said spring clips, cam means for first spreading said outer ends of said levers to spread the ends of the corresponding clip when said carriage is moved outwardly and thereafter releasing said levers to allow the spring clip to grip the wheel, springs tending to rock said outer ends away from each other, a pair of guide rods carried by said carriage and diverging outwardly towards the outer end of said carriage, a pair of slides mounted upon said guide rods and having fingers temporarily engaging the ends of the second of said spring clips, said slides adapted to release the second of said spring clips when said chain is completely wound around said wheel, said spring clips having interengaging members adapted to lock them together when in final position upon said wheel.

3. The combination of a vehicle having wheels and a body portion, a container carried by said body portion adjacent a wheel, a U-shaped carriage slidably carried within said container, means for projecting said carriage outwardly towards said wheel, a pair of levers pivotally carried by said carriage and positioned upon opposite sides of said wheel when said carriage is moved outwardly, a tire chain normally stored within said container and having spring clips at its ends adapted to transversely grip a peripheral portion of said wheel, the ends of said levers engaging the ends of one of said spring clips, cam means for first spreading the ends of said levers to spread the ends of the corresponding clip when said carriage is moved outwardly and thereafter releasing said levers to allow the spring clip to grip the wheel, and means for subsequently causing the other of said spring clips to grip the wheel, said last mentioned means consisting of a pair of divergent guides and slides thereon temporarily holding the ends of the last mentioned spring clip, and yielding means for normally holding the chain stored in said container and preventing rattling of said chain.

4. The combination of a vehicle having wheels and a body portion, a container carried by said body portion adjacent a wheel, a U-shaped carriage slidably carried within said container, manually controlled means for projecting said carriage outwardly towards said wheel, a pair of levers pivotally carried by said carriage and positioned upon opposite sides of said wheel when said carriage is moved outwardly, a tire chain normally stored within said container and having spring clips at its outer ends adapted to transversely grip a peripheral portion of said wheel, the outer ends of said levers engaging the ends of one of said spring clips, cam means for first spreading the ends of said levers to spread the ends of the corresponding clip when said carriage is moved outwardly and thereafter releasing said levers to allow the spring clip to grip the wheel, a pair of guide rods carried by said carriage and diverging outwardly towards the outer end of said carriage, a pair of slides mounted upon said guide rods and having fingers temporarily engaging the ends of the second of said spring clips.

5. The combination of a vehicle having wheels and a body portion, a container carried by said body portion adjacent a wheel, a U-shaped carriage slidably carried within said container, manually controlled means for projecting said carriage outwardly towards said wheel, a pair of levers pivotally carried by said carriage and positioned upon opposite sides of said wheel when said carriage is moved outwardly, a tire chain normally stored within said container and having spring clips at its outer ends adapted to transversely grip a peripheral portion of said wheel, the outer ends of said levers engaging the ends of one of said spring clips, cam means for first spreading the ends of said levers to spread the ends of the corresponding clip when said carriage is moved outwardly and thereafter releasing said levers to allow the spring clip to grip the wheel, a pair of guide rods carried by said carriage and diverging outwardly towards the outer ends of said carriage, a pair of slides mounted upon said guide rods and having fingers temporarily engaging the ends of the second of said spring clips, said slides adapted to release the second of said spring clips when said chain is completely wound around said wheel, said spring clips having interengaging members adapted to lock them together when in final position upon said wheel.

In testimony that I claim the foregoing I have hereunto set my hand at Milwaukee, in the county of Milwaukee and State of Wisconsin.

BERTRAM A. SMALL.